US006169342B1

(12) United States Patent
Schmillen et al.

(10) Patent No.: US 6,169,342 B1
(45) Date of Patent: Jan. 2, 2001

(54) ELECTROMAGNETIC ACTUATOR HAVING AN ELASTICALLY DEFORMABLE ARMATURE AND/ OR YOKE

(75) Inventors: Karl Schmillen, Kettenis (BE); Matthias Schneider, Aldenhoven; Jakob Nehl, Aachen, both of (DE); Philip Kley, Simpelveld (NL)

(73) Assignee: FEV Motorentechnik GmbH & Co. KG, Aachen (DE)

( * ) Notice: Under 35 U.S.C. 154(b), the term of this patent shall be extended for 0 days.

(21) Appl. No.: 09/120,844

(22) Filed: Jul. 23, 1998

(30) Foreign Application Priority Data

Jul. 24, 1997 (DE) .......................................... 297 13 167 U

(51) Int. Cl.[7] ....................................................... H02K 41/00

(52) U.S. Cl. ................................................................ 310/12

(58) Field of Search ................................. 310/12, 13, 14; 335/247, 248, 249, 257, 271, 277, 279, 281

(56) References Cited

U.S. PATENT DOCUMENTS

| | | | | |
|---|---|---|---|---|
| 4,187,452 | * | 2/1980 | Knappe et al. | 318/128 |
| 4,455,543 | | 6/1984 | Pischinger et al. | 335/266 |
| 5,181,004 | * | 1/1993 | Johnson | 336/198 |
| 5,583,387 | * | 12/1996 | Takeuchi et al. | 310/217 |
| 5,668,517 | * | 9/1997 | Wong | 335/257 |
| 5,775,670 | * | 7/1998 | Osterbrink | 335/257 X |
| 5,903,070 | * | 5/1999 | Göbel | 310/17 |
| 5,992,461 | * | 11/1999 | Gilmore et al. | 335/281 X |

* cited by examiner

*Primary Examiner*—Nestor Ramirez
*Assistant Examiner*—Judson H. Jones
(74) *Attorney, Agent, or Firm*—Venable; Gabor J. Kelemen

(57) ABSTRACT

An electromagnetic actuator includes an electromagnet composed of a yoke provided with a pole face and a solenoid which is carried by the yoke and which is energizable with electric current for generating electromagnetic forces. An armature coupled to a setting member is movable into engagement with and away from the pole face of the yoke. A resetting spring is connected to the armature for opposing movements of the armature toward the pole face. The yoke and/or the armature is at least in part elastically deformable toward the armature and the yoke, respectively.

10 Claims, 3 Drawing Sheets

ELECTROMAGNETIC ACTUATOR HAVING AN ELASTICALLY DEFORMABLE ARMATURE AND/ OR YOKE

CROSS REFERENCE TO RELATED APPLICATION

This application claims the priority of German Application No. 297 13 167.2 filed Jul. 24, 1997, which is incorporated herein by reference.

BACKGROUND OF THE INVENTION

Electromagnetic actuators are essentially formed of at least one electromagnet which has a solenoid and a yoke provided with at least one pole face, as well as an armature which is coupled with a setting member to be operated by the electromagnetic actuator and which is connected to at least one resetting means. The armature is moved from a first setting position determined by the resetting means into a second setting position by electromagnetic forces in an energized state of the solenoid. The second setting position is determined by the abutting relationship between the armature and the pole face of the energized electromagnet.

Electromagnetic actuators of the above-outlined type are used, for example, for controlling cylinder valves in piston-type internal-combustion engines. Such actuators include two electromagnets between which electromagnetic forces cause the armature to reciprocate against the force of two resetting means, for example, resetting springs, as the electromagnets are alternatingly energized and de-energized. By an appropriate control of the individual actuators which operate the respective cylinder valves, the intake and outflow of working medium may be effected such that the operating process may be optimally controlled as a function of the momentary operational requirements. Electromagnetically operated actuators for cylinder valves are disclosed, for example, in U.S. Pat. No. 4,455,543.

To ensure a high control accuracy, a relatively high energy has to be applied to the armature for its capture at a pole face of the electromagnet. A high energy input, however, is coupled with a diminishing operational reliability, because as a further problem the phenomenon of armature rebounding appears in a more pronounced manner. This problem is caused by the fact that the armature impinges on the pole face at a high speed and may rebound either immediately or after a short delay. Such rebound phenomena in the control of cylinder valves adversely affect the operation of a piston-type internal-combustion engine. Even in the absence of rebound, the impact between armature and pole face generates relatively strong, undesired noises. For reducing such noises, it has been proposed to provide the pole faces with an elastically deformable layer or to provide hollow spaces in the region of the pole faces and/or the cooperating counterfaces of the armature. As a result, shortly before the full engagement of the armature at the pole face, the air enclosed in the hollow spaces is compressed and thus the impact of the armature is dampened. Providing such hollow spaces is involved, however, with a substantial technological outlay and requires, for example, high-precision finishing operations.

SUMMARY OF THE INVENTION

It is an object of the invention to provide an improved electromagnetic actuator of the above-outlined type in which noise generation is reduced while maintaining the impact energy unchanged.

This object and others to become apparent as the specification progresses, are accomplished by the invention, according to which, briefly stated, the electromagnetic actuator includes an electromagnet composed of a yoke provided with a pole face and a solenoid which is carried by the yoke and which is energizable with electric current for generating electromagnetic forces. An armature coupled to a setting member (such as a cylinder valve of an internal-combustion engine) is movable into engagement with and away from the pole face of the yoke. A resetting spring is connected to the armature for opposing movements of the armature toward the pole face. The yoke and/or the armature is at least in part elastically deformable toward the armature and the yoke, respectively.

In this arrangement advantage is derived from the fact that the armature is connected to a central guide rod extending perpendicularly to the armature surface and that the magnetic force which increases exponentially with increasing approach of the armature to the pole face, is effective essentially in the edge zone of the armature and the yoke, while the counteracting resetting force which, as a rule, increases linearly, has its principal effect in the region where the armature is connected to the guide rod. Thus, by using an essentially plate-like, for example, 3 mm thick armature which may be circular, square or rectangular, and which is made of a soft-magnetic, elastically deformable material, during the approach of the armature to the pole face under the effect of the above-described forces, a deformation of the armature occurs such that its edge zone is slightly bent in the direction of motion. As a result, the armature first touches the pole face with its edge zone and lies only thereafter with its full surface area against the pole face as urged by the large magnetic force while, at the same time, it undergoes a reverse deformation, regaining its original shape. As a result, noise generation upon impact is reduced.

The principle according to the invention may also be implemented by rendering the yoke elastically deformable, for example, by forming the yoke of welded core laminae. In such a case too, the magnetic forces appearing between the yoke and the approaching armature result in deformations which lead to an initial contact between the armature and the pole face only over partial regions of the eventually engaging surfaces. The position of the partial regions for the initial contacting may be predetermined by an appropriate shaping of the pole surface and/or the associated armature surface.

Thus, the invention may be implemented by a variety of combinations, such as rigid yoke/elastically deformable armature, elastically deformable yoke/rigid armature and elastically deformable yoke/elastically deformable armature. The selection of the specific combination and/or configuration to be used depend on the given geometry of the pole face and the armature as well as on the effective magnetic forces.

According to an advantageous feature of the invention, the pole face of the electromagnet has a dish-shaped depression, whose cross section is such that it is adapted to the spatial deformability of the plate-shaped armature, predetermined by the edge contour thereof. It is an advantage of this arrangement that as the edge region of the armature impinges on the edge region of the dish-shaped depression of the pole face, upon further approach of the armature (as urged by magnetic forces), not only is the deformation, obtained during the earlier approach, counteracted and eliminated but until a total full-face engagement of the armature on the pole face takes place, the armature is elastically deformed in the opposite direction, thus generating an additional resetting force which reduces the impact until the full-face engagement. It is a further advantage in this arrangement that for introducing a counter motion to release the armature subsequent to the de-energization of the holding current, the additional resetting force which is present by virtue of the above-noted deformation of the armature in the position of full-face engagement, a faster release of the armature and thus a shortening of the "sticking period" of the armature at the pole face are achieved.

Whether the armature or the yoke is elastically deformable, it is an advantageous feature of the invention to provide, in the pole face, a convex central region projecting toward the armature. The dimensions of such convex projecting part are determined dependent upon the elastic deformability of the armature and/or the yoke.

According to yet another feature of the invention, the armature is a solid body of soft-magnetic iron and the yoke is expediently formed of welded core laminae.

Thus, in the design of the armature as concerns its strength, on the one hand magnetic conditions have to be fulfilled and, on the other hand, the elasticity or spring conditions have to be met. In designing the spring conditions, the thickness of the armature should preferably be selected such that compared to the usual working frequencies the armature is tuned as "low" as possible in the direction of deformation, that is, it has a low natural frequency so that no uncontrolled counter-oscillation is superposed on the deformation caused by magnetic and mass forces in the operational frequency range. It is therefore advantageous to provide means on the armature for increasing its elastic deformability. Such means may be, for example, grooves provided in the armature at a distance from the free periphery thereof, so that despite a relatively large armature thickness for meeting magnetic conditions, at the same time a significant elasticity and thus a relatively low natural frequency for the armature may be ensured.

According to a further feature of the invention, along the edge region of the pole face and/or the armature face oriented toward one another, a circumferential sealing element is arranged. As a result, the intermediate space between the pole face and the armature face is sealed immediately after the armature and the pole face engage along the edge regions and thus a dampening air cushion is obtained upon further deformation until a full-face engagement of the armature face on the pole face is reached.

In accordance with still another advantageous feature of the invention, in an armature which has a polygonal—particularly rectangular—circumferential contour, at least at the armature corners impact-damping elements are arranged. Such impact-damping elements prevent the armature from impacting hard on the walls of the surrounding actuator housing upon torsional oscillations of the armature caused by a resetting coil spring.

DESCRIPTION OF THE PREFERRED EMBODIMENTS

Figure 1:
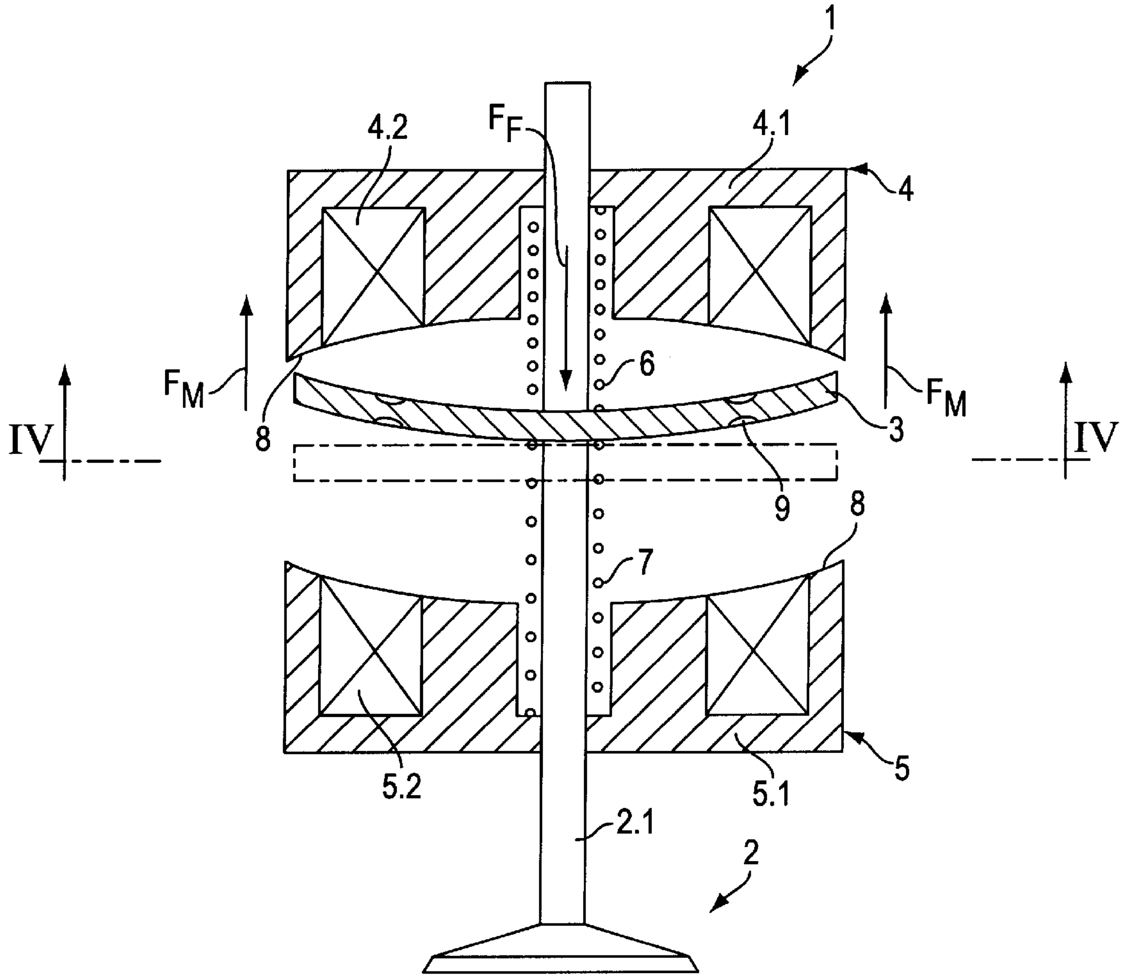
FIG. 1 is an axial sectional view of an electromagnetic actuator according to a preferred embodiment of the invention, taken along line I—I of FIG. 4.

Turning to FIG. 1, the electromagnetic actuator generally designated at 1 includes an armature 3 coupled to a cylinder valve 2 of an internal-combustion engine as well as a closing magnet 4 and an opening magnet 5 arranged at opposite sides of the armature 3 in a spaced relationship to one another. In a de-energized state of the electromagnets 4 and 5 the armature 3 is held in a position of rest between the two electromagnets by oppositely working resetting springs 6 and 7. The distance of the armature 3 to the pole faces 8 of the electromagnets 4 and 5 depends from the predetermined stroke of the setting member (valve 2) to be operated and from the design of the resetting springs 6 and 7. In the illustrated embodiment, the two resetting springs 6 and 7 are of identical design so that the position of rest of the armature 3, shown in dash-dot lines, is situated at mid distance between the two pole faces 8.

The two electromagnets 4 and 5 each have a respective yoke 4.1 and 5.1 carrying a respective solenoid 4.2 and 5.2. Thus, in the closed position of the cylinder valve 2 the armature 3 lies against the pole face 8 of the closing magnet 4 whereas in the open valve position the armature 3 lies against the pole face 8 of the opening magnet 5.

Figure 4:
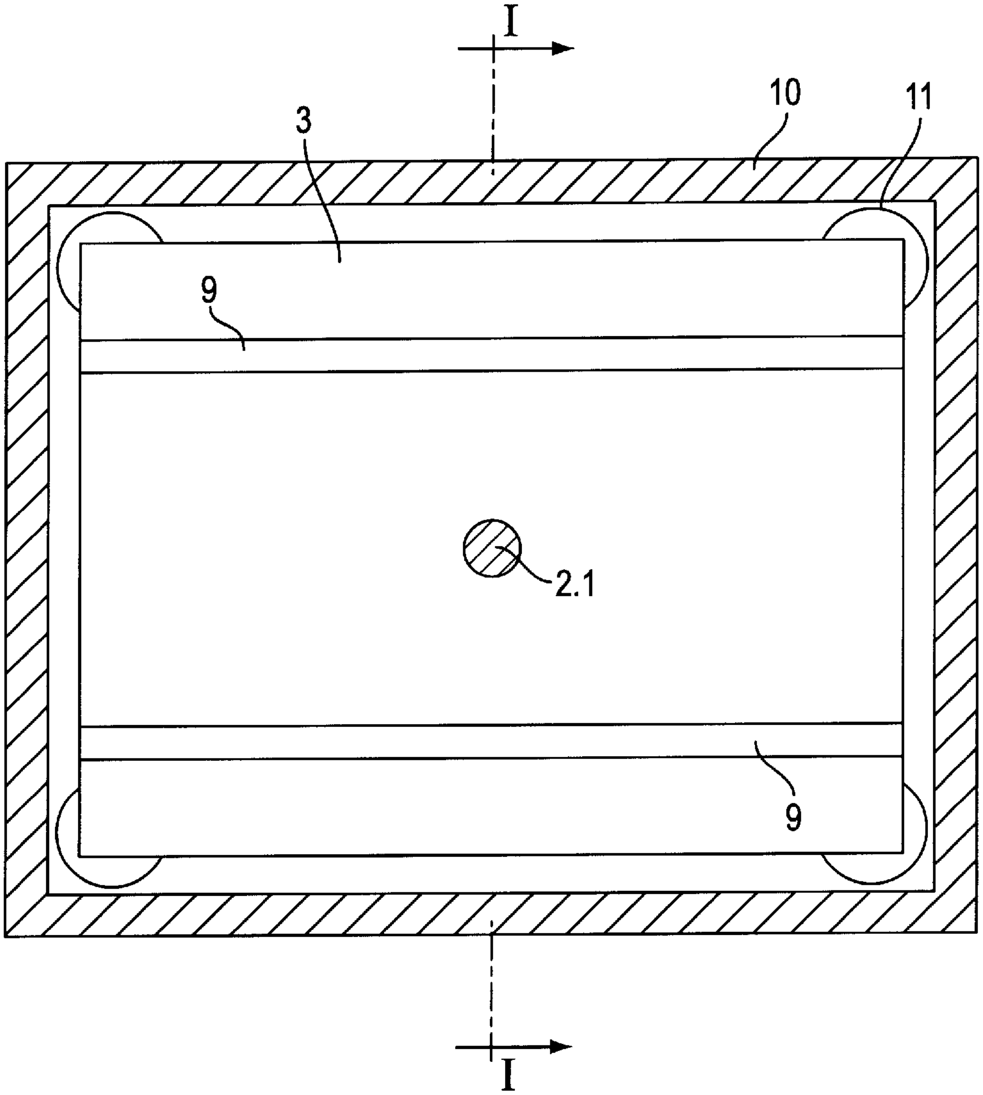
FIG. 4 is a sectional view taken along IV—IV of FIG. 1.

While in principle the pole face 8 of the two electromagnets 4 and 5 may be planar, in the embodiment shown, where the armature is rectangular as illustrated in FIG. 4, the pole faces 8 have a dish-shaped depression as shown in FIG. 1. The armature 3 which is made of an elastically deformable, soft-magnetic material, is designed in such a manner that under the influence of magnetic forces it is deformed corresponding to the depressed contour of the pole face 8 as it arrives into engagement with the edge regions thereof.

For operating the cylinder valve 2, that is, to initiate its motion, for example, from its open position into the closed position, the holding current passing through the solenoid 5.2 of the opening magnet 5 is switched off. As a result, the holding force of the opening magnet 5 falls below the spring force of the resetting spring (closing spring) 7, and thus the armature 3 begins its motion away from the opening magnet 5 as accelerated by the force of the resetting spring 7. After the armature 3 passes through the position of rest, the motion of the armature 3 is braked by the oppositely working resetting spring (opening spring) 6 associated with the closing magnet 4. To capture and hold the armature 3 in the closed position, the closing magnet 4 is energized so that the magnetic force which builds up and which exponentially increases in its effect on the armature 3 as the latter approaches the pole face 8, eventually brings the armature 3 to a full-face engagement with the pole face 8 against the only linearly increasing force of the resetting spring 6. The same events take place in a reverse order upon opening the cylinder valve 2.

FIG. 1 shows the electromagnetic actuator during operation in an intermediate position where the closing electromagnet 4 acting as the capturing magnet is already energized, whereby electromagnetic forces schematically shown by arrows $F_M$ act on the armature 3, particularly in the edge zones thereof. At the same time, the force $F_F$ of the return spring 6 acts on the armature 3 in the opposite (opening) direction in its central zone, that is, in the region of its connection with the rod 2.1, braking the motion of the armature 3. Accordingly, in addition to the electromagnetic forces $F_M$, in the edge zone mass inertia forces (not indicated) are effective which are codirectional with the forces $F_M$.

The above-described forces which affect the armature 3 as it approaches the respective capturing magnet (in the present instance the closing magnet 4) cause the elastically deformable armature 3 to bend in the direction of motion along its edge zone and accordingly, the armature 3 initially touches the pole face 8 only with its edge region and arrives into a full-face engagement with the pole face 8 subsequently while, at the same time, the armature 3 undergoes a reverse deformation to regain its original shape. If, as shown in the embodiment according to FIG. 1, the pole face 8 is of depressed configuration, the armature 3, until it arrives into a full-face engagement, is deformed in the opposite direction so that additionally to the force of the resetting spring 6, the resetting force of the oppositely bent armature 3 becomes effective. As a result, the armature 3 arrives softly at the pole face 8 of the capturing electromagnet and thus the generation of a noise pulse is largely suppressed.

In the FIG. 1 embodiment which has a depressed pole face, the resetting force derived from the deformation of the elastic armature causes acceleration of the cylinder valve after de-energization of the holding current so that the armature is released more readily from the pole face.

Dependent upon the thickness of the armature 3, for increasing the elastic deformability, grooves 9 may be provided in the pole face as shown in FIG. 4.

Instead of grooves 9 or other cross-sectionally weakened portions which form means to increase the elastic deformability, it is feasible to provide an armature of rigid structure with spring components, such as leaf springs stamped out from the edge regions of the armature, for dampening the impact of the armature on the pole face.

Figure 2:
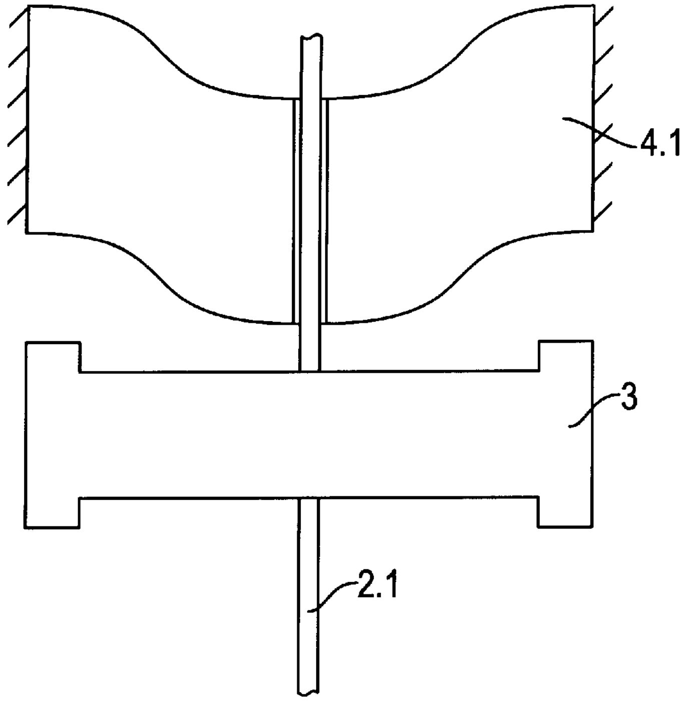
FIG. 2 is a schematic side elevational view illustrating the deformation of an elastically deformable yoke upon approach of the armature of the electromagnetic actuator according to another preferred embodiment.
Figure 3:
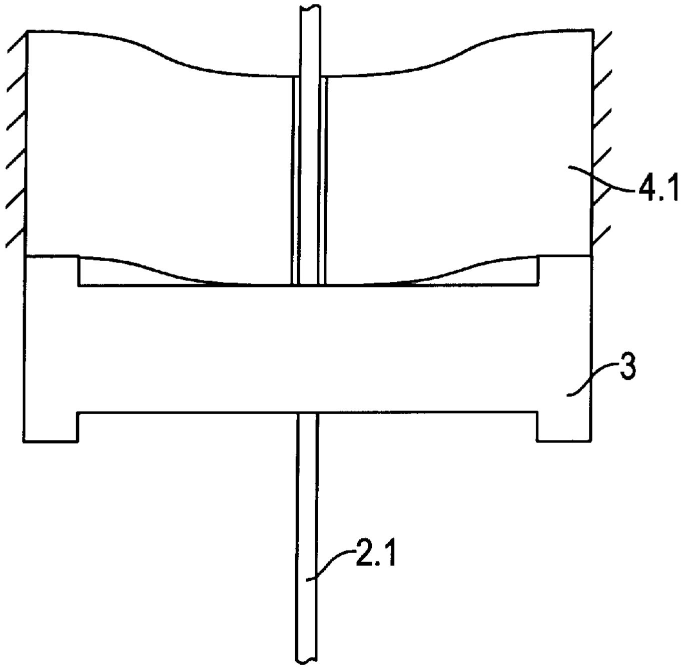
FIG. 3 is a view similar to FIG. 2, illustrating the armature as it lies against the pole face.

FIGS. 2 and 3 show schematically the principle of the conditions of deformation when using a substantially rigid armature and a deformable yoke. FIG. 2 shows the deformation of an elastically deformable yoke 4.1 during the approach of a rigid armature 3, corresponding to the conditions of displacement as described in connection with FIG. 1. FIG. 3 shows the armature 3 as it lies against the yoke 4.1. As it may be seen in FIG. 2, the armature 3, by virtue of the curved configuration which the yoke 4.1 assumes based on its elastic deformation, initially contacts the pole face only over a partial central portion, and only subsequently does the armature lie with its edge on the pole face as illustrated in FIG. 3. The deformation is shown in a significantly exaggerated manner for a better illustration of the principle. It is expedient to provide the armature with an axially slightly thickened periphery.

While FIG. 1, for the sake of simplicity and clarity, does not show the actuator housing which accommodates the two electromagnets 4 and 5, such housing is shown in FIG. 4 and designated at 10. The housing 10 defines a narrow clearance between itself and the two electromagnets 4 and 5, so that if the armature 3 has a polygonal circumferential outline and is urged to execute rotary oscillations about the axis of the rod 2.1, it has the tendency to collide with the inner wall faces of the housing 10. To prevent such a hard collision, the armature corners are provided with impact dampening elements 11 made, for example, of polytetrafluorethylene (PTFE) or similar wear resistant material.

Figure 5:
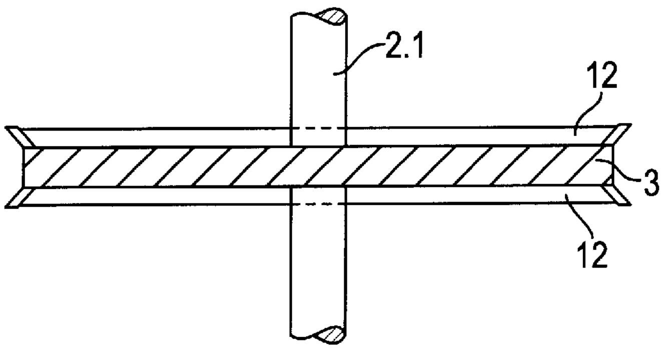
FIG. 5 is a fragmentary side elevational view of an armature according to another preferred embodiment of the invention.

In the embodiment illustrated in FIG. 5 the periphery of the armature 3 is provided with a circumferentially extending lip-like sealing elements 12 which, as the armature impinges on the pole face 8, seal the surrounded intermediate space so that between the pole face 8 and the associated counterface of the armature 3 a dampening air cushion can be built up. If, as shown in FIG. 5, the sealing elements 12 are arranged such that they project beyond the free edges of the armature 3, the sealing elements at the same time may serve as abutting elements. Such sealing elements may also be provided along edge regions of the pole face 8.

It will be understood that the above description of the present invention is susceptible to various modifications, changes and adaptations, and the same are intended to be comprehended within the meaning and range of equivalents of the appended claims.

What is claimed is:

1. In an electromagnetic actuator including an electromagnet having a first component constituting a yoke provided with a pole face; and a solenoid carried by the yoke and being energizable with electric current for generating electromagnetic forces;

a second component constituting an armature coupled to a setting member and being movable into engagement with and away from the pole face of the yoke; and a resetting spring connected to said armature for opposing movement of the armature toward the pole face;

the improvement wherein at least one of said first and second components is of a soft-magnetic, elastically deformable material and is, at least in part, itself elastically deformable toward the other of said first and second components.

2. The electromagnetic actuator as defined in claim 1, wherein said pole face has a depressed area.

3. The electromagnetic actuator as defined in claim 1, wherein said pole face has, at least in a central region thereof, a convexly curved area portion projecting towards said armature.

4. The electromagnetic actuator as defined in claim 1, wherein said yoke comprises welded, core laminae.

5. The electromagnetic actuator as defined in claim 1, wherein said armature is composed of soft-magnetic material.

6. The electromagnetic actuator as defined in claim 1, wherein said armature is of said soft-magnetic, elastically deformable material, and further wherein said armature comprises means for increasing the elastic deformability thereof.

7. The electromagnetic actuator as defined in claim 6, wherein said means for increasing said elastic deformability comprises grooves provided in said armature.

8. The electromagnetic actuator as defined in claim 1, further comprising a circumferential sealing element provided on and along at least one of said first and second components; said sealing element being oriented toward the other of said first and second components.

9. The electromagnetic actuator as defined in claim 1, wherein said armature has a polygonal outline having a plurality of corners; further comprising buffer elements carried by said armature at said corners.

10. In an electromagnetic actuator including an electromagnet having a first component constituting a yoke provided with a pole face; and a solenoid carried by the yoke and being energizable with electric current for generating electromagnetic forces;

a second component constituting an armature coupled to a setting member and being movable into engagement with and away from the pole face of the yoke; and a resetting spring connected to said armature for opposing movement of the armature toward the pole face;

the improvement wherein at least one of said first and second components is at least in part elastically deformable toward the other of said first and second components during motion of said second component in a direct response to the electromagnetic forces.

* * * * *